United States Patent [19]

Jackson, Jr. et al.

[11] 4,360,648

[45] Nov. 23, 1982

[54] PROCESS FOR THE PREPARATION OF POLYESTERS AND POLY(ESTER-CARBONATES)

[75] Inventors: Winston J. Jackson, Jr., Kingsport, Tenn.; William R. Darnell, Weber City, Va.

[73] Assignee: Eastman Kodak Company, Rochester, N.Y.

[21] Appl. No.: 207,811

[22] Filed: Nov. 17, 1980

[51] Int. Cl.$^3$ ...................... C08G 63/64; C08L 69/00
[52] U.S. Cl. .................................. 525/462; 525/439; 525/466; 528/176
[58] Field of Search ..................... 525/466, 462, 439; 528/176

[56] References Cited

U.S. PATENT DOCUMENTS

| | | | |
|---|---|---|---|
| 3,313,862 | 4/1967 | Siggel et al. | 528/176 |
| 4,105,633 | 8/1978 | Swart et al. | 528/176 |
| 4,219,635 | 8/1980 | Cooke et al. | 525/446 |
| 4,278,787 | 7/1981 | Swart et al. | 528/176 |
| 4,311,822 | 1/1982 | Dege et al. | 528/176 |

*Primary Examiner*—Wilbert J. Briggs, Sr.
*Attorney, Agent, or Firm*—William P. Heath, Jr.; Daniel B. Reece, III

[57] ABSTRACT

Process for the preparation of polyesters and poly(ester-carbonates) comprising heating aromatic diol polycarbonates and esters of dicarboxylic acids in the presence of ester exchange and polymerization catalysts.

8 Claims, No Drawings

PROCESS FOR THE PREPARATION OF POLYESTERS AND POLY(ESTER-CARBONATES)

DESCRIPTION

Technical Field

This invention is a process for the preparation of polyesters and poly(ester-carbonates). The process involves heating aromatic diol polycarbonates and esters of dicarboxylic acids in the presence of a suitable catalyst. Polymers prepared by the process may contain 5-100 mole % of dicarbxylic acid moieties, based on total acid.

The polyesters and poly(ester-carbonates) prepared by the process of this invention have utility as molding plastics, fibers, films, adhesives, coatings, extruded shapes and the like.

Using the process of this invention, polymers can be prepared which have inherent viscosities of up to 1.0 or more, depending upon the purity of the starting materials, the catalyst utilized, and the thermal stability of the polymers. The polymers prepared by the process of this invention have inherent viscosities of at least 0.35 and preferably about 0.6.

Disclosure of Invention

Process for preparing polyesters and poly(ester-carbonates) comprising
(a) preparing a reaction mixture of
  (1) an aromatic polycarbonate (A) having the general formula

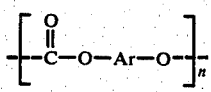

wherein Ar is the residue remaining after the removal of the hydroxy groups from at least one aromatic diol and optionally the residue may be substituted with alkyl groups containing 1-4 carbon atoms or phenyl,
an ester of a dicarboxylic acid (B) having the general formula

wherein R may be the same or different and is selected from aliphatic, cycloaliphatic and aryl groups containing up to 8 carbon atoms, and Y is the residue remaining after removal of the carboxyl groups from an aliphatic, cycloaliphatic or aromatic dicarboxylic acid, and
  (3) a catalytic amount of a suitable ester exchange and polymerization catalyst,
(b) initially heating said reaction mixture sufficiently to substantially reduce the melt viscosity of the reaction mixture,
(c) increasing the temperature as required to keep the reaction mixture molten and to distill away the dialkyl or diaryl carbonate condensation by-product, and
(d) reducing pressure to further remove said by-product and to increase the molecular weight of the polymer product, and wherein (A) and (B) are present in molar percentages of (B)=0.05(A) to 1.0(A).

The aromatic polycarbonates (A) are prepared by procedures well known to those skilled in the art, such as by phosgenation of an aromatic diol or esterification of an aromatic diol with diphenyl carbonate. The esters of dicarboxylic acids are also prepared by procedures well known to those skilled in the art.

Polyesters (100% dicarboxylate moiety with no carbonate moiety) may be prepared by the process of this invention by using equimolar amounts of (A) and (B), i.e. (A)=(B). Equation 1 illustrates this case.

1. [(A)=(B)=1]

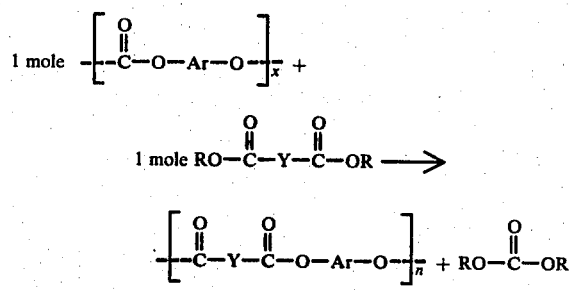

Poly(ester-carbonates) containing lower levels of the dicarboxylate moiety are prepared by decreasing (B) toward the minimum of (B)=0.05(A). Equations 2 and 3 illustrate two such cases.

2. [(B)=0.05(A)]

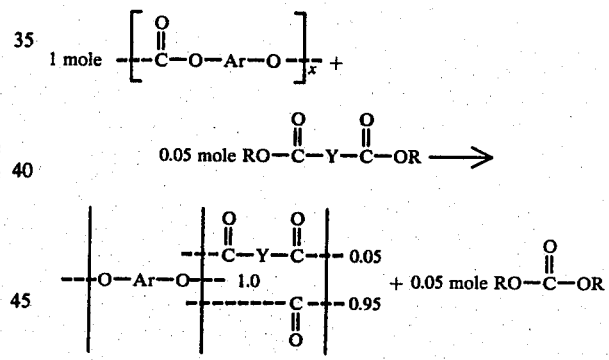

3. [(B)=0.5(A)]

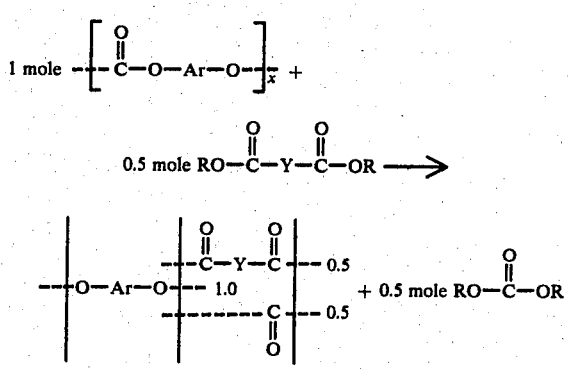

In the general structural formulae in equations 1-3, (Ar) is the residue remaining after removal of the hydroxy groups from an aromatic diol. (Note that the starting material is the polycarbonate of the aromatic diol.) It may be substituted with alkyl groups containing 1-4 carbon atoms and phenyl and may contain fused rings. The process is not limited to polycarbonates containing only one (Ar) moiety. Examples of such aromatic diols are: 4,4'-(cyclohexylidene)diphenol, 4,4'-(isopropylidene)diphenol, 4,4'-dihydroxybiphenyl, methylhydroquinone, t-butylhydroquinone, 2,6-naphthalenediol, 1,5-naphthalenediol, 1,4-naphthalenediol, hydroquinone, resorcinol, phenylhydroquinone, 4,4'-dihydroxydiphenylmethane, 4,4'-dihydroxydiphenyl ether, and 4,4'-dihydroxydiphenylsulfone. Polycarbonates containing one or more of these as well as other aromatic diol moieties, (Ar), may be used in the process of this invention so long as the starting polycarbonates and the polyesters and poly(ester-carbonates) prepared therefrom have sufficiently low melting points to be reactive in the process and sufficient thermal stability to withstand the conditions of polymer preparation. It is preferred that (Ar) be derived from biphenol A.

The polycarbonates from which are derived the previously stated (Ar) moieties may have inherent viscosities (I.V.'s) of ~0.1 up to 2-3 or more, but I.V.'s of about 0.5-0.6 are preferred.

The R's in the general formulae in equations 1-3 may be the same or different and are selected from aliphatic, cycloaliphatic and aryl groups containing up to 8 carbon atoms. Examples of such groups are methyl, ethyl, butyl, cyclohexyl, 2-ethylhexyl, phenyl, and tolyl. It is preferred that the R's be methyl groups.

In the general formulae in equations 1-3, "Y" is the residue remaining after removal of the carboxyl groups from an aliphatic, cycloaliphatic, or aromatic dicarboxylic acid. Examples of such acids are azelaic, sebacic, dodecanedioic, dimerized fatty acids (such as dimer acid), cyclohexanedicarboxylic, terephthalic, isophthalic, and naphthalenedicarboxylic acids.

Catalysts which may be used in the process of the invention include compounds of titanium, tin, lead or alkaline earth metals used in combination with antimony or germanium. Titanium catalysts, such as tetraisopropyltitanate (titanium tetraisopropoxide), are preferred.

The catalyst concentration, based on the metal itself, may vary from about 10 ppm to about 1000 ppm metal based on the theoretical polymer yield, depending upon the catalyst specie and polymerization conditions used, but the preferred catalyst concentration is 50-250 ppm titanium for the preferred catalyst, tetraisopropyltitanate.

The new process may be carried out at 200°-360° C. or more by a melt polymerization technique or, as in the case of high melting polymers, solid phase polymerization of a melt-prepared prepolymer. Generally, the process is begun by heating the polycarbonate, an ester of dicarboxylic acid, and the catalyst at ~280° C. until the melt viscosity (from the polycarbonate) has decreased very substantially. The reaction temperature is then increased as required to keep the polymerization mixture molten and to distill away the dialkyl or diaryl carbonate condensation by-product. Finally, vacuum is applied and the pressure is decreased during ~10-45 minutes to 0.5 torr or less to attain a high molecular weight polymer. Generally, this latter step of the polymerization is carried out at 320°-360° C.

In some cases it may be preferred or essential to prepare the polymer by solid-phase polymerization techniques. This is accomplished by first preparing a prepolymer to relatively low molecular weight in the melt. The prepolymer is then comminuted, crystallized, and further polymerized in the solid state. The solid-state polymerization is preferably carried out above about 265° C., and at temperatures at least 10° C. below the melting point of the polymer.

This invention will be further illustrated by the following examples although it will be understod that these examples are included merely for purposes of illustration and are not intended to limit the scope of the invention.

EXAMPLES

In the examples, the inherent viscosities of the polymers are determined at 25° C. in a 40/36/24 weight mixture of p-chlorophenol/phenol/1,1,2,2-tetrachloroethane at a concentration of 0.10 g./100 mL. The melting points are determined with a Perkin-Elmer DSC-2 differential scanning calorimeter. Films are pressed in a Hannafin press at about 20° C. or more above the melting point of the respective polymers. The $^{13}C$ NMR spectra are obtained with a Bruker HX-90E carbon-13 NMR spectrophotometer, using a mixture of trifluoroacetic acid/d-chloroform as a solvent.

1. This example illustrates the preparation of a poly(ester-carbonate) containing 50 mole % of the carbonate moiety by the process of this invention.

A mixture of 25.4 g. (0.10 mole) bisphenol A polycarbonate, I.V. 0.60; 9.70 g. (0.05 mole) dimethyl terephthalate; and titanium tetraisopropoxide (150 ppm Ti, based on theoretical polymer yield) are placed in a glass flask equipped with metal stirrer and provision for maintaining a nitrogen atmosphere in the flask. Provision is also made for applying vacuum to the flask. The flask is evacuated to 0.5 torr and purged with nitrogen three times. The contents of the flask are then vacuum dried at 0.2 torr for 30 minutes in a metal bath heating at 110° C., cooled, and bled to a nitrogen atmosphere. After the metal bath temperature is increased to 320° C., the flask is again immersed and heated with stirring. After about 10 minutes, the melt viscosity of the mixture in the reaction flask begins to decrease rapidly, and a low boiling distillate is noted after ~30 minutes heating. After one hour at 320° C., the metal bath temperature is increased to 340° C. and heating is continued for an additional hour. At this time, vacuum is applied to the flask, and the pressure is reduced to 0.5 torr during about 10 minutes. The polymerization is continued for an additional 90 minutes at 0.5 torr and 340° C. to obtain a high melt viscosity, amber polymer. The I.V. of the polymer is 0.59, and a film pressed at 320° C. is tough and haze-free. Analysis of the polymer by $^{13}C$ NMR indicates it is a poly(ester-carbonate) of bisphenol A with 53/47 mole % terephthalate/carbonate.

2. This example illustrates the use of a diphenyl ester of a dicarboxylic acid instead of a dialkyl ester in the process of the invention.

Example 1 is repeated, except 15.9 g. (0.05 mole) diphenyl terephthalate is used instead of dimethyl terephthalate and the time at 340° C. and 0.5 torr is 43 minutes. A high melt viscosity, amber polymer is obtained which has an I.V. of 0.80. A film pressed at 320° C. is clear and tough.

3. This example illustrates the use of dibutyltin diacetate, instead of titanium tetraisopropoxide, as a catalyst in the process of the invention.

Example 1 is repeated, except dibutyltin diacetate (50 ppm Sn, based on the theoretical yield of polymer) is used as a catalyst instead of titanium tetraisopropoxide. In this case the time at 340° C. and 0.5 torr is 150 minutes. A high melt viscosity, amber polymer is obtained, having an I.V. of 0.66.

4. This example illustrates the preparation of a poly(ester-carbonate) containing 30 mole % of an aliphatic dicarboxylic acid moiety.

A mixture of 76.2 g. (0.30 mole) bisphenol A polycarbonate, I.V. 0.60; 20.73 g. (0.09 mole) dimethyl sebacate; and titanium tetraisopropoxide (150 ppm titanium, based on the theoretical polymer yield) are placed in a glass flask equipped as described in Example 1. After being purged with nitrogen three times, the flask contents are vacuum dried at 100° C. for 30 minutes at 0.5 torr. The flask is immersed in a metal bath maintained at 280° C. and heated with stirring under nitrogen for 110 minutes. After 30 minutes heating, a low-boiling distillate is evident. The metal bath temperature is increased to 300° C. for 45 minutes, then to 320° C. for 30 minutes. At this time vacuum is applied to the flask, and the pressure is reduced to 0.5 torr during 25 minutes. The polymerization is continued at 320° C. and 0.5 torr for 115 minutes to obtain a high melt viscosity, amber polymer having an I.V. of 0.96.

5. This example illustrates the use of an ester of a cycloaliphatic acid in the process of the invention.

A mixture of 25.4 g. (0.10 mole) bisphenol A polycarbonate, I.V. 0.60, 10.0 g. (0.05 mole) of trans-dimethyl 1,4-cyclohexanedicarboxylate, and titanium tetraisopropoxide (150 ppm titanium, based on theoretical yield of polymer) are placed in a glass flask equipped as described in Example 1. After being purged three times with nitrogen, the flask contents are vacuum dried at 100° C. for 30 minutes at 0.5 torr. The flask is immersed in a metal bath maintained at 280° C. and heated with stirring under nitrogen for 70 minutes. After about 25 minutes heating, a low-boiling distillate is evident. The metal bath temperature is then increased to 320° C. for 15 minutes and vacuum is applied to the flask. The pressure is decreased to 0.5 torr during about 11 minutes. The polymerization is carried out under these conditions for 28 minutes, and then the metal bath temperature is increased to 340° C. After being heated at 340° C. and 0.5 torr for 48 minutes, the polymer becomes a highly viscous melt. The I.V. of the polymer is 0.96, and $^{13}C$ NMR analysis indicates the molar ratio of carbonate/1,4-cyclohexanedicarboxylate is 52/48.

6. This example illustrates the use of a low I.V. (0.11) polycarbonate starting material in the process of this invention.

Example 1 is repeated, except the I.V. of the bisphenol A polycarbonate used is 0.11, and the time under vacuum (0.5 torr) at 340° C. is 15 minutes. The polymer has an I.V. of 0.35.

7. This example illustrates the use of phenylhydroquinone polycarbonate, instead of bisphenol A polycarbonate, in the process of this invention.

Example 5 is repeated except the ingredients used are as follows:

a. 21.2 g. (0.10 mole) phenylhydroquinone polycarbonate, I.V. 0.39.
b. 9.7 g. (0.05 mole) dimethyl terephthalate.
c. 150 ppm titanium (based on theoretical polymer weight) from titanium tetraisopropoxide.

The polymer obtained is amber and tough, and has an I.V. of 0.52.

8. This example illustrates the solid-phase preparation of a poly(ester-carbonate) by the process of this invention.

Prepolymer Preparation—A mixture of 317.5 g. (1.25 mole) bisphenol A polycarbonate (I.V. 0.60), 169.75 g. (0.875 mole) dimethyl terephthalate, and titanium tetraisopropoxide (~150 ppm titanium, based on theoretical polymer yield) are placed in a large glass flask equipped as described in Example 1. After being purged three times with nitrogen, the contents of the flask are vacuum dried at 100° C. and 0.5 torr for 30 minutes. While being stirred under nitrogen, heating of the flask is begun at 300° C. in a metal bath and continued for 60 minutes. After heating for 41 minutes, a low-boiling distillate is evident. The temperature of the metal bath is increased to 320° C. and held for 50 minutes. At this time a very low melt viscosity, transparent polymerization mixture is evident. Vacuum is applied over a period of 45 minutes to 0.5 torr, and continued for 15 minutes and stopped. The "prepolymer" is transparent and has an I.V. of 0.26. The carbonate content by $^{13}C$ NMR is 31 mole % (69 mole % terephthalate).

The prepolymer is ground through a ¼-inch screen, then slurried in acetone overnight to crystallize the prepolymer. The crystallized prepolymer is filtered out and vacuum dried at 80° C. overnight in a vacuum over at 20 inches of mercury. The prepolymer has a melting point of 206° C.

Solid-Phase Buildup—Thirty grams of the above prepolymer are placed in each of four glass tubes which are connected to a manifold via ground-glass joints and rubber tubing. The tubes are evacuated to 0.3 torr and then placed in a heated aluminum block maintained at 100° C. for 30 minutes. While the pressure in the tubes is maintained at 0.2–0.3 torr, the temperature of the metal block is increased as follows:

a. 45 minutes at 200° C.
b. 30 minutes at 225° C.
c. 80 minutes at 250° C.
d. 85 minutes at 275° C.
e. 75 minutes at 290° C.

The yellow polymer particles have an I.V. of 0.62, a melting point of 325° C., and a Tg of 187° C. Analysis by $^{13}C$ NMR indicates the poly(ester-carbonate) contains a 31/69 molar ratio of carbonate/terephthalate.

9. This example illustrates the preparation of a polyester (containing essentially no carbonate moiety) by the process of the invention.

Example 1 is repeated with respect to equipment, nitrogen purging, and vacuum drying of the ingredients. The ingredients used are as follows:

a. 19.05 g. (0.075 mole) of bisphenol A polycarbonate, I.V. 0.60.
b. 10.19 g. (0.0525 mole) dimethyl terephthalate.
c. 4.37 g. (0.0225 mole) dimethyl isophthalate.
d. Titanium tetraisopropoxide (150 ppm titanium, based on the theoretical polymer yield).

The flask is heated with stirring under nitrogen in a metal bath maintained at 300° C. for 85 minutes, and the metal bath temperature is increased to 320° C. After being stirred at 320° C. for 10 minutes, the flask is placed under partial vacuum (190 torr) and the pressure is decreased slowly during 45 minutes to 100 torr. The metal bath temperature is further increased to 340° C., and the pressure is gradually decreased to 45 torr during 48 minutes, to 30 torr during 42 minutes, and to 0.5 torr during 40 minutes. The flask is stirred at 340° C. and ≦0.5 torr for an additional 15 minutes to obtain an amber, transparent, high melt viscosity polymer in 100% yield. The polymer I.V. is 0.81, and a film pressed at 350° C. is very tough and haze-free. Analysis by $^{13}$C NMR and IR indicate the polymer is essentially all polyester with only a detectable amount of carbonate present.

The invention has been described in detail with particular reference to preferred embodiments thereof, but it will be understood that variations and modifications can be effected within the spirit and scope of the invention.

We claim:

1. Process for preparing polyesters and poly(estercarbonates) comprising
   (a) preparing a reaction mixture of
      (1) an aromatic polycarbonate having an inherent viscosity of about 0.1 or more and (A) having the general formula

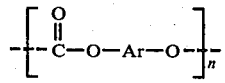

wherein Ar is the residue remaining after the removal of the hydroxy groups from at least one aromatic diol and optionally the residue may be substituted with alkyl groups containing 1-4 carbon atoms or phenyl,
      (2) an ester of a dicarboxylic acid (B) having the general formula

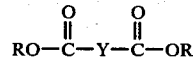

wherein R may be the same or different and is selected from aliphatic, cycloaliphatic and aryl groups containing up to 8 carbon atoms, and Y is the residue remaining after removal of the carboxyl groups from an aliphatic, cycloaliphatic or armatic dicarboxylic acid, and
      (3) a catalytic amount of a suitable ester exchange and polymerization catalyst,
   (b) initially heating said reaction mixture sufficiently to substantially reduce the melt viscosity of the reaction mixture,
   (c) increasing the temperature as required to keep the reaction mixture molten and to distill away the dialkyl or diaryl carbonate condensation by-product, and
   (d) reducing pressure to further remove said by-product and to increase the molecular weight of the polymer product.

2. Process of claim 1 wherein Ar is the residue remaining after the removal of the hydroxyl groups from bisphenol A and the ester of a dicarboxylic acid is dimethyl terephthalate.

3. Process of claim 1 wherein (A) and (B) are present in molar percentages of (B)=0.05 (A) to 1.0 (A).

4. Process of claim 1 wherein said catalyst is selected from compounds of titanium, tin, lead, or alkaline earth metals in combination with antimony or germanium.

5. Process of claim 1 wherein the catalyst concentration, based on the metal, is about 10 parts per million to about 1000 parts per million metal based on the theoretical polymer yield.

6. Process of claim 4 wherein said catalyst is a titanium compound.

7. Process of claim 4 wherein the catalyst is tetraisopropyltitanate and the concentration is about 50 to about 250 parts per million metal based on the theoretical polymer yield.

8. Process of claim 1 wherein a prepolymer is prepared, comminuted, crystallized and further polymerized in the solid state at a temperature of about 265° C. or more but at least 10° C. below the melting point of the polymer.

* * * * *